United States Patent
Kakutani et al.

(10) Patent No.: US 12,209,225 B2
(45) Date of Patent: Jan. 28, 2025

(54) NATURAL GAS PRETREATMENT SYSTEM AND METHOD FOR PRETREATING NATURAL GAS

(71) Applicant: JGC CORPORATION, Kanagawa (JP)

(72) Inventors: Yuzuru Kakutani, Kanagawa (JP); Yugo Furubayashi, Kanagawa (JP); Hirokatsu Uchida, Kanagawa (JP)

(73) Assignee: JGC CORPORATION, Kanagawa (JP)

( * ) Notice: Subject to any disclaimer, the term of this patent is extended or adjusted under 35 U.S.C. 154(b) by 672 days.

(21) Appl. No.: 17/432,481

(22) PCT Filed: Jun. 19, 2019

(86) PCT No.: PCT/JP2019/024327
§ 371 (c)(1),
(2) Date: Aug. 19, 2021

(87) PCT Pub. No.: WO2020/255302
PCT Pub. Date: Dec. 24, 2020

(65) Prior Publication Data
US 2022/0145201 A1 May 12, 2022

(51) Int. Cl.
*B01D 53/02* (2006.01)
*B01D 53/04* (2006.01)
(Continued)

(52) U.S. Cl.
CPC .......... *C10L 3/106* (2013.01); *B01D 53/0407* (2013.01); *B01D 53/0454* (2013.01);
(Continued)

(58) Field of Classification Search
CPC ........... B01D 2252/20431; B01D 2252/20489; B01D 2253/108; B01D 2253/308;
(Continued)

(56) References Cited

U.S. PATENT DOCUMENTS 5,234,472 A * 8/1993 Krishnamurthy ....... C01B 32/40
95/143
6,471,749 B1 * 10/2002 Kawai .................. F25J 3/04157
95/123
(Continued)

FOREIGN PATENT DOCUMENTS

| JP | 2010209296 | 9/2010 |
|---|---|---|
| WO | 2007007571 | 1/2007 |
| WO | 2017033217 | 3/2017 |

OTHER PUBLICATIONS

"International Search Report (Form PCT/ISA/210) of PCT/JP2019/024327," mailed on Sep. 10, 2019, with English translation thereof, pp. 1-3.

(Continued)

*Primary Examiner* — Christopher P Jones
(74) *Attorney, Agent, or Firm* — JCIPRNET (57) ABSTRACT

A natural gas pretreatment system includes: a carbon dioxide removal unit configured to remove carbon dioxide from the natural gas by bringing an absorption liquid and the natural gas into contact with each other; and a water removal unit configured to remove water by causing the natural gas to flow through a packed bed containing a water adsorbent. The packed bed contains a carbon dioxide adsorbent for adsorbing and removing the carbon dioxide that has not been completely removed in the carbon dioxide removal unit, and a concentration of the carbon dioxide contained in the natural gas is measured by an outlet-side carbon dioxide measurement unit on an outlet side of the water removal unit.

5 Claims, 7 Drawing Sheets

(51) Int. Cl.
  *B01D 53/14* (2006.01)
  *B01D 53/18* (2006.01)
  *B01D 53/26* (2006.01)
  *B01D 53/28* (2006.01)
  *B01J 20/18* (2006.01)
  *C10L 3/10* (2006.01)

(52) U.S. Cl.
  CPC ..... *B01D 53/1412* (2013.01); *B01D 53/1475* (2013.01); *B01D 53/18* (2013.01); *B01D 53/261* (2013.01); *B01D 53/28* (2013.01); *B01J 20/18* (2013.01); *C10L 3/104* (2013.01); *B01D 2252/20431* (2013.01); *B01D 2252/20489* (2013.01); *B01D 2253/108* (2013.01); *B01D 2253/308* (2013.01); *B01D 2257/504* (2013.01); *B01D 2257/80* (2013.01); *B01D 2259/4146* (2013.01); *C10L 2290/08* (2013.01); *C10L 2290/541* (2013.01); *C10L 2290/542* (2013.01)

(58) Field of Classification Search
  CPC .......... B01D 2257/504; B01D 2257/80; B01D 2259/4146; B01D 53/0407; B01D 53/0454; B01D 53/1412; B01D 53/1475; B01D 53/18; B01D 53/261; B01D 53/28; B01D 2256/245; B01D 2257/304; B01D 2257/602; B01D 53/0423; B01D 53/30; B01D 53/64; B01D 53/75; B01J 20/18; C10L 2290/08; C10L 2290/541; C10L 2290/542; C10L 3/104; C10L 3/106; C10L 2290/58; C10L 3/101; C10L 3/102; C10L 3/12; Y02C 20/40
  See application file for complete search history.

(56) References Cited

U.S. PATENT DOCUMENTS

| | | | |
|---|---|---|---|
| 6,572,681 B1 * | 6/2003 | Golden | F25J 3/04163 95/122 |
| 9,802,149 B1 * | 10/2017 | Knox | B01D 53/0454 |
| 2014/0224118 A1 | 8/2014 | Zhou et al. | |
| 2015/0298048 A1 * | 10/2015 | Cho | B01D 53/62 96/111 |
| 2016/0279561 A1 * | 9/2016 | Burgers | B01D 53/226 |
| 2018/0169561 A1 * | 6/2018 | Jonnavittula | C01B 21/0466 |
| 2019/0111377 A1 * | 4/2019 | Dube | B01D 53/0454 |
| 2021/0101107 A1 * | 4/2021 | Heidel | B01D 5/006 |

OTHER PUBLICATIONS

"Office Action of Russia Counterpart Application", issued on Sep. 1, 2022, with English translation thereof, p. 1-p. 12.

* cited by examiner

NATURAL GAS PRETREATMENT SYSTEM AND METHOD FOR PRETREATING NATURAL GAS

CROSS-REFERENCE TO RELATED APPLICATION

This application is a 371 application of an international PCT application serial no. PCT/JP2019/024327, filed on Jun. 19, 2019. The entirety of the above-mentioned patent application is hereby incorporated by reference herein and made a part of this specification.

TECHNICAL FIELD

The present invention relates to a technology for treating a natural gas containing carbon dioxide.

BACKGROUND ART

A pretreatment facility configured to perform pretreatment for removing various impurities from a natural gas to be treated is provided in a liquefied natural gas (LNG) plant configured to liquefy a natural gas and a separation and recovery plant configured to separate and recover a liquefied petroleum gas (LPG) and a heavy component from the natural gas. In the pretreatment facility, carbon dioxide, water, and the like are removed in order to prevent the natural gas to be cooled during liquefaction treatment and separation and recovery treatment from clogging the inside of the facility.

For example, in Patent Literature 1, there is described a technology involving continuously performing an amine washing step of absorbing and removing hydrogen sulfide and carbon dioxide by bringing a natural gas into contact with an amine absorption liquid, and a water removal step of adsorbing and removing water and the like by causing the natural gas to flow through an adsorption column filled with synthetic zeolite.

Meanwhile, in Patent Literature 1, there is not described a technology for designing the water removal step in consideration of the occurrence of a fluctuation in the amine washing step.

CITATION LIST

Patent Literature

[PTL 1] WO 2017/033217 A1

SUMMARY OF INVENTION

Technical Problem

The present invention has been made in view of the above-mentioned background, and provides a technology for removing carbon dioxide having flowed out along with an operation fluctuation from a natural gas even when the operation fluctuation occurs in a carbon dioxide removal unit configured to remove carbon dioxide contained in the natural gas through use of an absorption liquid.

Solution to Problem

According to one embodiment of the present invention, there is provided a natural gas pretreatment system for a liquefaction plant or a separation and recovery plant of a natural gas, the natural gas pretreatment system including:

a carbon dioxide removal unit configured to remove carbon dioxide contained in the natural gas by bringing an absorption liquid and the natural gas into contact with each other; and a water removal unit configured to remove water contained in the natural gas by causing the natural gas after being brought into contact with the absorption liquid in the carbon dioxide removal unit to flow through a packed bed containing a water adsorbent, wherein the packed bed contains a carbon dioxide adsorbent for adsorbing and removing the carbon dioxide that has not been completely removed in the carbon dioxide removal unit, and wherein the natural gas pretreatment system further includes an outlet-side carbon dioxide measurement unit configured to measure a concentration of the carbon dioxide contained in the natural gas on an outlet side of the water removal unit.

The natural gas pretreatment system may have the following features.

(a) The water adsorbent and the carbon dioxide adsorbent are each a molecular sieve, and the carbon dioxide adsorbent has an average pore diameter of the molecular sieve larger than an average pore diameter of the molecular sieve of the water adsorbent.

(b) In the above-mentioned item (a), when the molecular sieve forming the water adsorbent is 3A-type zeolite, the molecular sieve forming the carbon dioxide adsorbent contains at least one zeolite selected from 4A-type zeolite, 5A-type zeolite, 10X-type zeolite, and 13X-type zeolite, and when the molecular sieve forming the water adsorbent is 4A-type zeolite, the molecular sieve forming the carbon dioxide adsorbent contains at least one zeolite selected from 5A-type zeolite, 10X-type zeolite, and 13X-type zeolite.

(c) In the above-mentioned item (a), the packed bed has the water adsorbent and the carbon dioxide adsorbent packed therein so as to be separated into different layers, and when viewed along a flow direction of the natural gas, the layer of the carbon dioxide adsorbent is arranged on a downstream side with respect to the layer of the water adsorbent.

(d) The natural gas pretreatment system further includes an inlet-side carbon dioxide measurement unit configured to measure a concentration of the carbon dioxide contained in the natural gas on an inlet side of the water removal unit.

(e) The natural gas pretreatment system further includes a control unit configured to increase a circulation amount of the absorption liquid in the carbon dioxide removal unit or to decrease a treatment amount of the natural gas, when the concentration of the carbon dioxide contained in the natural gas measured in the outlet-side carbon dioxide measurement unit is more than a preset controlled value, and a state in which the concentration of the carbon dioxide is more than the preset controlled value is continued for a preset time or more.

Advantageous Effects of Invention

According to the above-mentioned technology, in addition to the packed bed of the water adsorbent forming the water removal unit, the packed bed of the carbon dioxide adsorbent for adsorbing and removing the carbon dioxide that has not been completely removed in the carbon dioxide removal unit in a previous stage is further formed, and the concentration of the carbon dioxide contained in the natural gas is measured on the outlet side of the water removal unit. With this configuration, even when an operation fluctuation occurs on the carbon dioxide removal unit side in the previous stage, and the natural gas containing the carbon dioxide in an amount equal to or more than the controlled value flows out, the outflow of the carbon dioxide to the downstream side of the water removal unit can be suppressed.

BRIEF DESCRIPTION OF DRAWINGS

(a) of FIG. 4 and (b) of FIG. 4 are each a schematic view for illustrating a packed structure of an adsorbent in an adsorption column.

(a) of FIG. 7 and (b) of FIG. 7 are each a graph for showing a change in concentration of carbon dioxide in a natural gas at the time of occurrence of a spike.

DESCRIPTION OF EMBODIMENTS

First, a flow of treatment of a natural gas to be performed in a liquefied natural gas (LNG) plant 1 is described with reference to FIG. 1.

A natural gas to be handled in the LNG plant 1 in this example contains impurities, such as water and carbon dioxide ($CO_2$).

Figure 1:
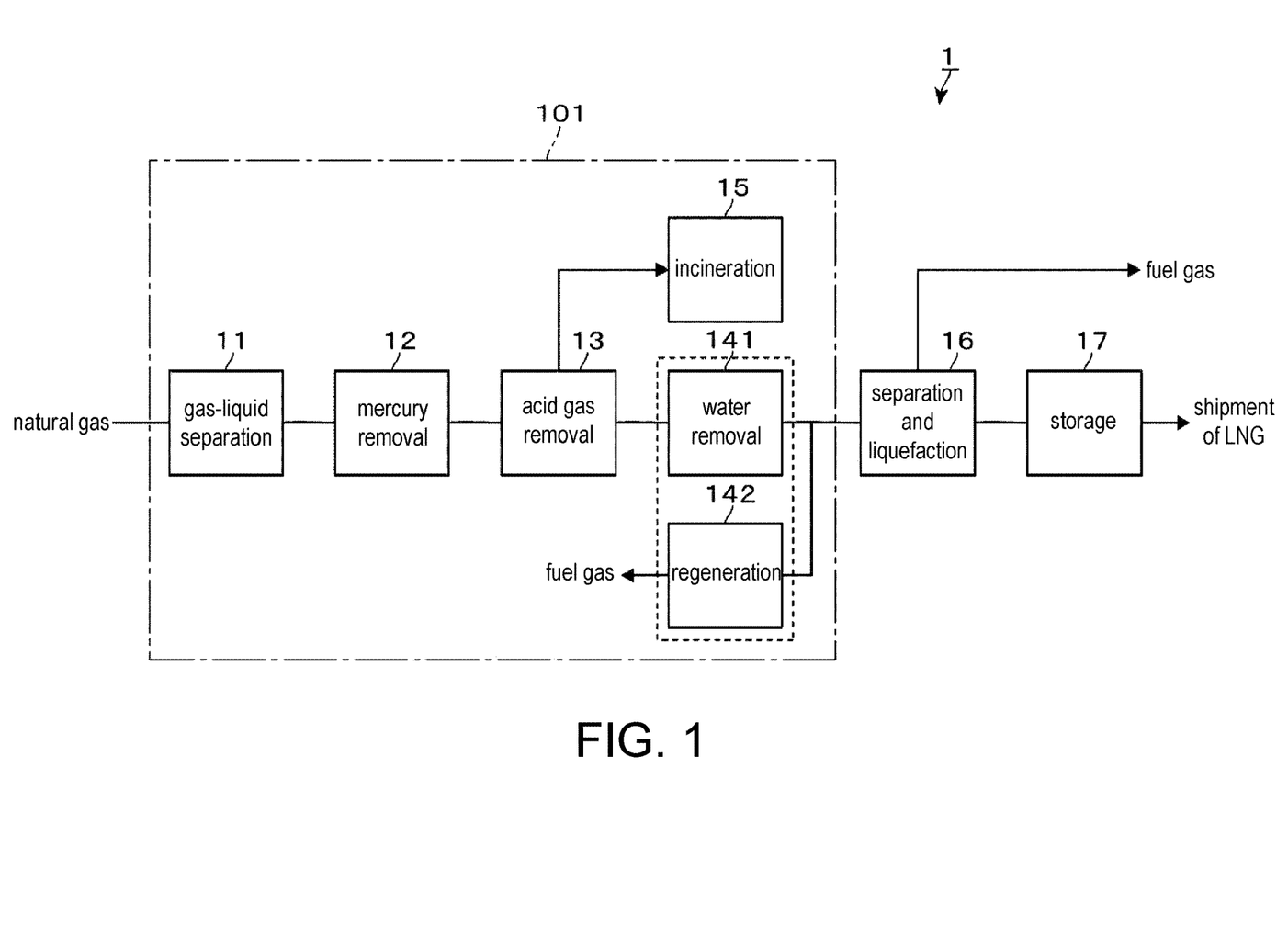
FIG. 1 is a block diagram for illustrating an overview of a LNG plant.

As illustrated in FIG. 1, for example, a liquid is separated from a natural gas, which is produced in a natural gas well and transported through a pipeline or the like, in a gas-liquid separation unit 11, and then mercury is removed from the resultant in a mercury removal unit 12. $CO_2$, hydrogen sulfide ($H_2S$), and the like (sometimes referred to collectively as "acid gas") are removed in a subsequent acid gas removal unit 13, and hydrogen sulfide separated from the natural gas is incinerated in an incineration unit 15.

Further, water in the natural gas is removed in a water removal unit 14. Thus, removal of impurities before liquefaction is completed. As described below, the removal of water in the natural gas is performed, for example, through use of a plurality of, for example, three adsorption columns 31a to 31c. The adsorption columns 31a to 31c are each switched between an adsorption column 141 configured to perform water removal through use of water removal zeolite 313 described later and an adsorption column 142 configured to desorb adsorbed water by heating to regenerate the water removal zeolite 313.

The gas-liquid separation unit 11, the mercury removal unit 12, the acid gas removal unit 13, and the water removal unit 14 are operated in a pretreatment facility 101. The mercury removal unit 12 may be arranged between the water removal unit 14 and a separation and liquefaction unit 16.

The natural gas from which the impurities have been removed in the pretreatment facility 101 is cooled in the separation and liquefaction unit 16, with the result that a natural gas liquid (NGL) such as a LPG and a heavy component is separated. The natural gas from which the NGL has been separated is further cooled and liquefied to provide a liquefied natural gas (LNG). The separation and liquefaction unit 16 includes a heat exchanger configured to cool and liquefy the natural gas through use of a refrigerant, a compressor configured to compress the refrigerant, a fractionator configured to perform distillation and separation of the LPG and the heavy component, and the like, but the detailed description thereof is omitted.

The LNG liquefied in the separation and liquefaction unit 16 is shipped to a LNG tanker or a pipeline through a storage unit 17 formed of a LNG tank.

As described above, the gas-liquid separation unit 11, the mercury removal unit 12, the acid gas removal unit 13, and the water removal unit 14 provided in the pretreatment facility 101 are each designed so as to remove specific impurities from the natural gas. Meanwhile, the inventors of the present application have understood that, in the acid gas removal unit 13 configured to remove an acid gas ($CO_2$, $H_2S$, etc.) through use of an absorption liquid, a phenomenon in which the concentration of $CO_2$ in the natural gas after treatment abruptly rises for a short period of time may occur sporadically (hereinafter this phenomenon is sometimes referred to as "$CO_2$ spike").

The frequency of occurrence of the $CO_2$ spike tends to increase when the treatment amount of the natural gas approaches a treatment upper limit of the acid gas removal unit 13. Accordingly, in the LNG plant 1 in which the $CO_2$ spike occurs, it may be difficult to maintain the production amount of the LNG in the vicinity of the upper limit.

In view of the foregoing, the LNG plant 1 in this example has a configuration in which a $CO_2$ removal function is imparted to the water removal unit 14 as well as the acid gas removal unit 13, and the concentration of $CO_2$ in the natural gas supplied to the separation and liquefaction unit 16 is managed in a pretreatment system formed of the acid gas removal unit 13 and the water removal unit 14.

Now, specific configurations of the acid gas removal unit 13 and the water removal unit 14 are described with reference to FIG. 2 and FIG. 3.

Figure 2:
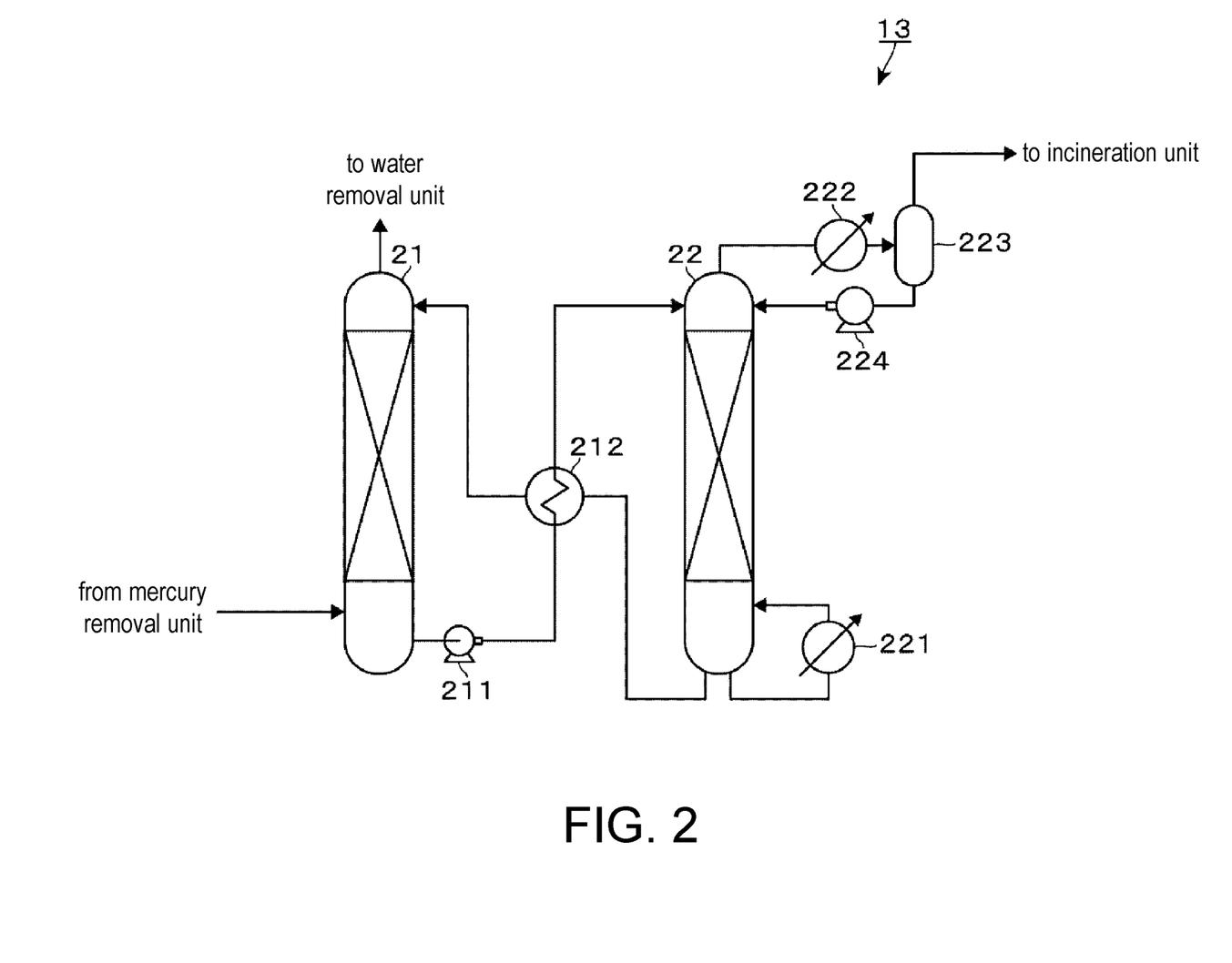
FIG. 2 is a configuration view of an acid gas removal unit.

In FIG. 2, there is illustrated an example of a facility configuration of the acid gas removal unit 13.

The natural gas is reduced in content of mercury to, for example, 5 nanograms/$Nm^3$ or less with a mercury removal adsorbent in the mercury removal unit 12 in a previous stage, and then supplied to the acid gas removal unit 13.

The acid gas removal unit 13 includes an absorption column 21 configured to cause the absorption liquid to absorb an acid gas contained in the natural gas by bringing the natural gas and an absorption liquid into contact with each other, and a regeneration column 22 configured to regenerate the absorption liquid having absorbed the acid gas.

In the absorption column 21, an absorption liquid containing an amine compound is dispersed and supplied in a state of, for example, liquid droplets from a column top side, whereas the natural gas after the removal of mercury is supplied from a column bottom side. As a result, the absorption liquid and the natural gas are brought into convection contact with each other in the absorption column 21, and thus $CO_2$, which is an acid gas having a risk of being solidified in LNG at the time of liquefaction, is absorbed from the natural gas into the absorption liquid, and removed therefrom.

At this time, $CO_2$ and a sulfur compound, such as $H_2S$ or mercaptan, are also absorbed and removed by, for example, selecting an absorption liquid (for example, methyldiethanolamine (MDEA)) capable of absorbing these $H_2S$ and the like and adjusting a liquid load (the amount of the absorption liquid to be supplied to the absorption column 21 per unit time) and the number of absorption columns. As a result, an influence of $H_2S$ on equipment of the water removal unit 14 and the separation and liquefaction unit 16 in subsequent stages, and as well, the content of the sulfur compound in LNG as a product are reduced.

The absorption liquid which has absorbed $CO_2$, $H_2S$, and the like in the absorption column 21 is transferred to the regeneration column 22 with a liquid feed pump 211. In the regeneration column 22, the absorption liquid which has absorbed the acid gas is dispersed and supplied in a state of, for example, liquid droplets from a column top side. Meanwhile, the absorption liquid in the column is heated with a reboiler 221 arranged on a column bottom side. Thus, the acid gas absorbed into the absorption liquid is emitted.

The acid gas ($CO_2$, $H_2S$, and the like) emitted from the absorption liquid is cooled with a cooler 222, subjected to gas-liquid separation in a separation drum 223, and then transferred to the incineration unit 15. The acid gas after incineration of $H_2S$ and the other sulfur compound in the incineration unit 15 is discharged to the atmosphere after being subjected to necessary exhaust gas treatment.

In addition, part of the absorption liquid discharged from a column top of the regeneration column 22 in a steam state is cooled with the cooler 222 to be condensed, subjected to gas-liquid separation in the separation drum 223 to be separated from the acid gas, and then returned to the regeneration column 22 with a circulation pump 224.

The absorption liquid regenerated in the regeneration column 22 is extracted from a column bottom of the regeneration column 22, and returned to the absorption column 21 with the liquid feed pump 211. At this time, as illustrated in FIG. 2, the absorption liquid may be preheated before being supplied to the regeneration column 22 through heat exchange between the absorption liquid extracted from the absorption column 21 and the absorption liquid extracted from the regeneration column 22 through use of a heat exchanger 212.

The acid gas removal unit 13 described above is configured to remove $CO_2$ and $H_2S$ and other sulfur compounds until the concentration of $CO_2$ and the concentration of $H_2S$ and other sulfur compounds in the natural gas at an outlet of the absorption column 21 reach 50 mol ppm or less and 3 mol ppm or less, respectively.

Figure 3:
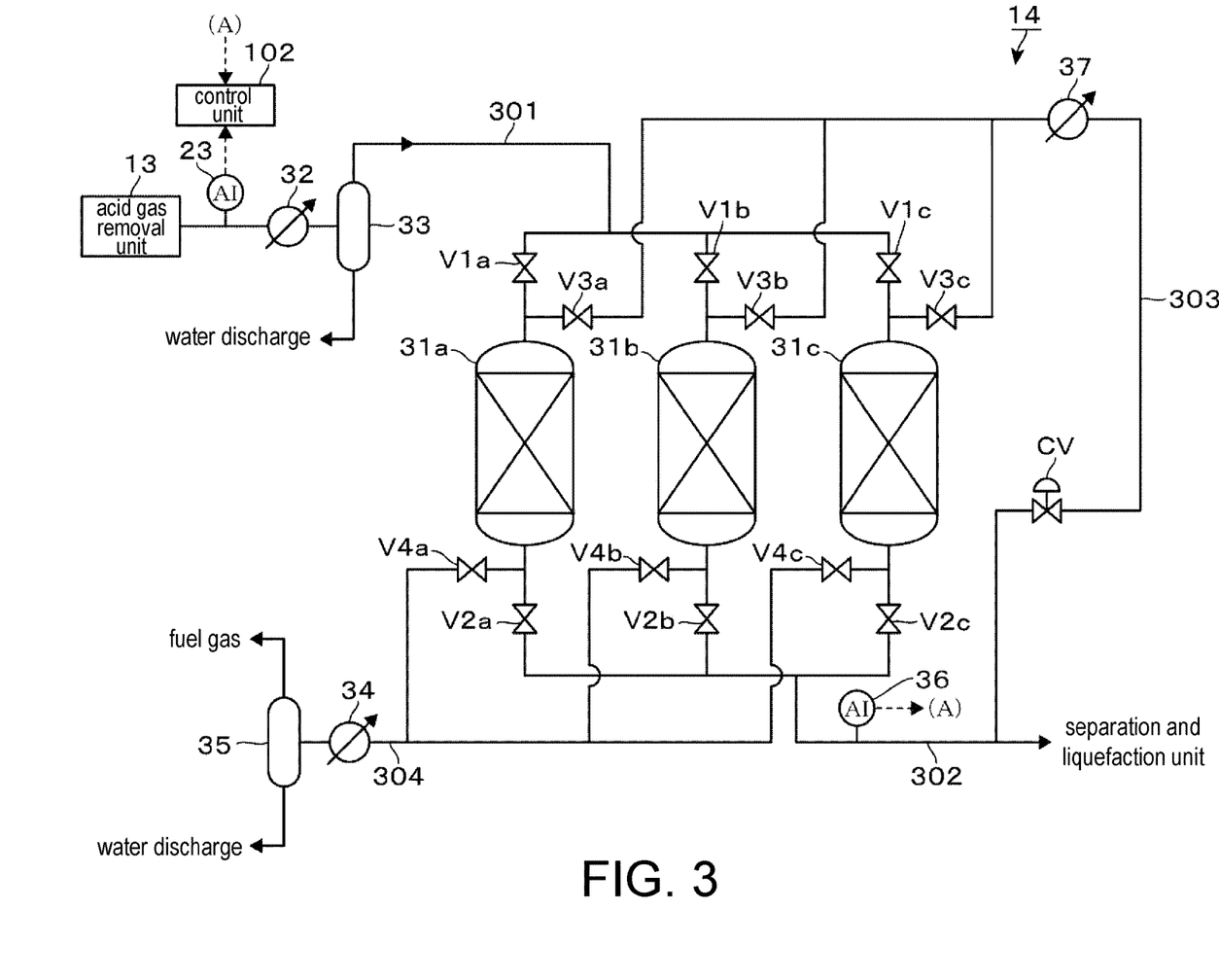
FIG. 3 is a configuration view of a water removal unit.

As illustrated in FIG. 3, a $CO_2$ concentration meter 23 is provided on the outlet side of the acid gas removal unit 13 (inlet side of the water removal unit 14), and is configured to manage the concentration of $CO_2$ in the natural gas after being treated in the acid gas removal unit 13. The $CO_2$ concentration meter 23 corresponds to an inlet-side carbon dioxide measurement unit in this example.

Next, a configuration example of the water removal unit 14 is described with reference to FIG. 3. The natural gas from which the acid gas has been removed in the acid gas removal unit 13 is cooled by a cooler 32, and has condensed water removed therefrom by a separation drum 33. After that, the natural gas is supplied to the adsorption columns 31$a$ to 31$c$. The adsorption columns 31$a$ to 31$c$ are filled with a water adsorbent made of synthetic zeolite.

The water removal unit 14 illustrated in FIG. 3 includes the three adsorption columns 31$a$ to 31$c$. While water is removed by the two adsorption columns 31$a$ and 31$b$ (adsorption columns 31$b$ and 31$c$ or adsorption columns 31$c$ and 31$a$) (adsorption column 141 of FIG. 1), the remaining one adsorption column 31$c$ (adsorption column 31$a$ or adsorption column 31$b$) regenerates synthetic zeolite (adsorption column 142 of FIG. 1).

As illustrated in FIG. 3, a supply line 301 for a natural gas from the acid gas removal unit 13 is branched to be connected to the inlets of the respective adsorption columns 31$a$ to 31$c$. Further, a regeneration gas line 303 for supplying a regeneration gas for regenerating the synthetic zeolite having adsorbed water through heating is connected to those inlets. In this example, the natural gas after the removal of water in the adsorption columns 31$a$ to 31$c$ (hereinafter sometimes referred to as "dried natural gas") is used as the regeneration gas.

Open/close valves V1$a$ to V1$c$ are arranged in the branched supply lines 301 connected to the respective adsorption columns 31$a$ to 31$c$. In addition, open/close valves V3$a$ to V3$c$ are arranged in pipe lines that are branched from end portions of the regeneration gas line 303 and connected to the inlets of the respective adsorption columns 31$a$ to 31$c$. With such configuration, in each of the adsorption columns 31$a$ to 31$c$, a pipe line connected to the inlet of the adsorption column can switch between the supply line 301 and the regeneration gas line 303.

Meanwhile, an outlet line 302 for the dried natural gas is connected to the outlets of the respective adsorption columns 31$a$ to 31$c$. Those outlet lines 302 are joined together on a downstream side and connected to the separation and liquefaction unit 16.

Further, the already-described regeneration gas line 303 for supplying, as the regeneration gas, the dried natural gas to the inlets of the respective adsorption columns 31$a$ to 31$c$ is branched from the outlet line 302 on a downstream side of the joined portion.

The regeneration gas line 303, which is branched from the outlet line 302, includes a flow control valve CV, and a heating unit 37, which includes a heat exchanger, and is configured to heat the regeneration gas (dried natural gas). The flow control valve CV is configured to perform flow control so that the flow rate of the regeneration gas to be supplied to the adsorption columns 31$a$ to 31$c$ is a preset value based on a value of flow rate detected with a flow meter (not shown) arranged on a downstream side of the flow control valve CV. In addition, the heating unit 37 is configured to perform temperature control so that the temperature of the regeneration gas to be supplied to the adsorption columns 31$a$ to 31$c$ is a preset value based on a value of temperature detected with a thermometer (not shown) arranged on a downstream side of the heating unit 37. The heating unit 37 may be formed of a heating furnace.

In addition to those components, an spent regeneration gas line 304 for discharging the regeneration gas after regeneration of the synthetic zeolite (exhaust gas) is connected to the outlets of the respective adsorption columns 31$a$ to 31$c$. Those spent regeneration gas line 304 is connected to a separation drum 35 configured to separate condensed water or the like and the exhaust gas from each other after passing through a cooler 34 for cooling the exhaust gas. Water separated from the exhaust gas in the separation drum 35 is discharged to the outside after being subjected to necessary wastewater treatment. Meanwhile, the exhaust gas from which free water has been removed (natural gas) is utilized as a fuel gas in the LNG plant 1.

Open/close valves V2$a$ to V2$c$ are arranged in the outlet lines 302 connected to the respective adsorption columns 31$a$ to 31$c$. In addition, open/close valves V4$a$ to V4$c$ are arranged in pipe lines that are connected to the outlets of the respective adsorption columns 31$a$ to 31$c$ and joined together toward the spent regeneration gas line 304. With such configuration, in each of the adsorption columns 31$a$ to 31$c$, a pipe line connected to the outlet of the adsorption column can switch between the outlet line 302 and the spent regeneration gas line 304.

In the water removal unit 14 having the above-mentioned configuration, a packed bed containing a carbon dioxide adsorbent for adsorbing and removing $CO_2$ contained in the natural gas is formed in addition to a water adsorbent for adsorbing and removing water contained in the natural gas in each of the adsorption columns 31a to 31c.

Figure 4:
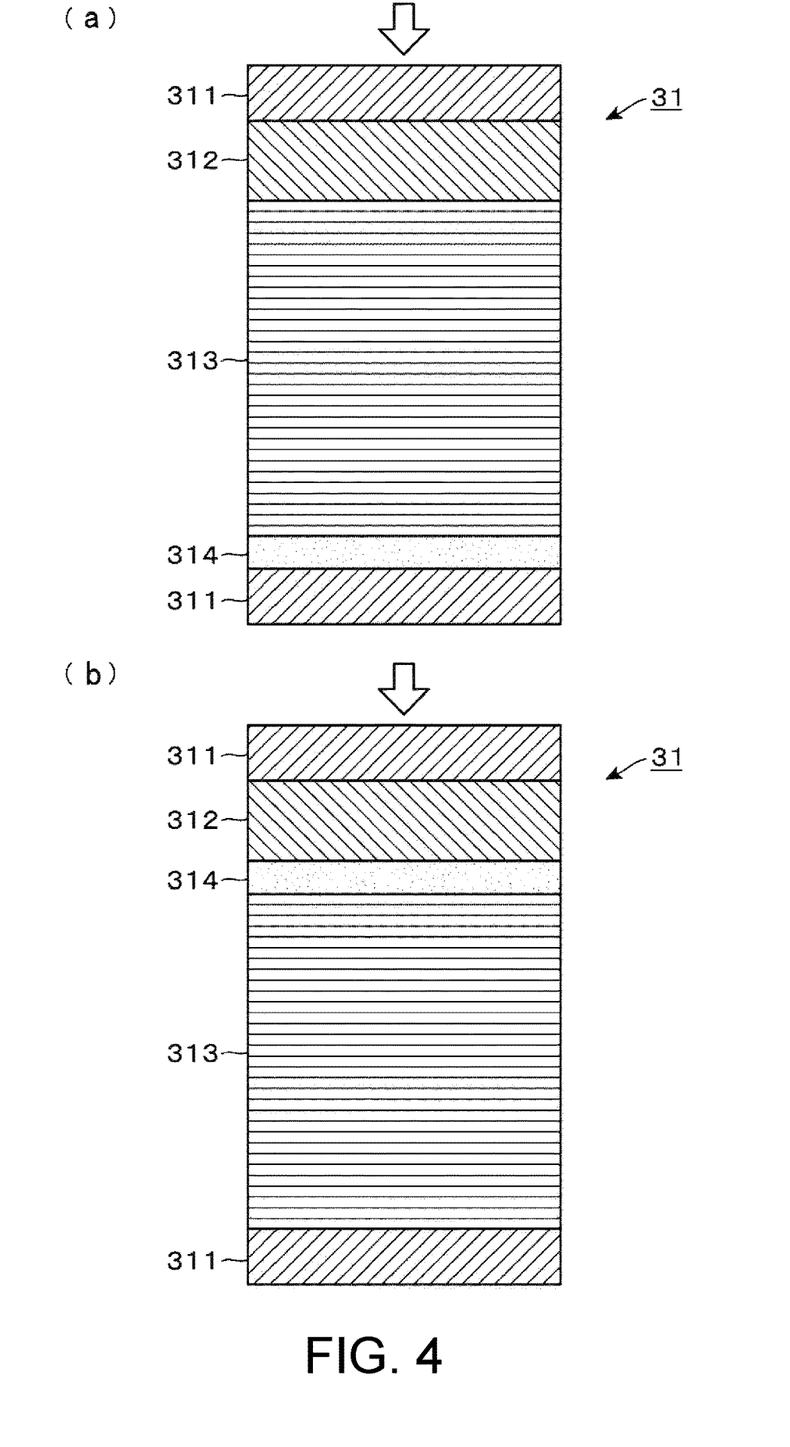

In each of (a) of FIG. 4 and (b) of FIG. 4, a configuration example of the packed bed in each of the adsorption columns 31 (31a to 31c) is schematically illustrated. For example, the packed bed has a structure in which respective layers of ceramic balls 311 for supporting the packed bed, silica gel 312 for removing free water that has not been completely separated by the separation drum 33, the water removal zeolite 313 serving as a water adsorbent, and $CO_2$ removal zeolite 314 serving as a carbon dioxide removal agent are laminated.

As described above, both the water removal agent and the carbon dioxide removal agent are made of synthetic zeolite. Meanwhile, the $CO_2$ removal zeolite 314 has a different structure from that of the water removal zeolite 313 in that the $CO_2$ removal zeolite 314 uses zeolite having an average pore diameter larger than that of the water removal zeolite 313.

Synthetic zeolite, which is a molecular sieve, has the ability to adsorb and remove molecules smaller than the pore diameter of the synthetic zeolite.

Water molecules having an effective diameter of less than 0.3 nm can be adsorbed and removed by 3A-type zeolite having an average pore diameter of 0.3 nm. In this case, in order to suppress a decrease in water removal ability in association with the adsorption of other components each having an effective diameter larger than that of water contained in the natural gas, 3A-type zeolite may be adopted as the water removal zeolite 313.

Meanwhile, $CO_2$ has an effective diameter of more than 0.3 nm, and hence is hardly adsorbed or removed by the above-mentioned 3A-type zeolite. In view of the foregoing, 4A-type zeolite (effective diameter: 0.4 nm), 5A-type zeolite (effective diameter: 0.5 nm), 10X-type zeolite (effective diameter: 0.9 nm), 13X-type zeolite (effective diameter: 1.0 nm), each having an average pore diameter larger than that of the 3A-type zeolite, are used as a carbon dioxide removal agent.

In the following description, zeolite having an effective diameter larger than that of the water adsorbent is also referred to as "large pore diameter zeolite".

The $CO_2$ removal zeolite 314 serving as a carbon dioxide adsorbent may be made of only one kind selected from the above-mentioned various large pore diameter zeolites, or made of a mixture of a plurality of kinds of large pore diameter zeolites. Further, the 3A-type zeolite and one or plurality of kinds of large pore diameter zeolites may be mixed to form the $CO_2$ removal zeolite 314. The $CO_2$ adsorbent other than zeolite may be made of, for example, silica gel or activated alumina.

In addition, in some water removal units 14, the above-mentioned 4A-type zeolite having an average pore diameter larger than that of the 3A-type zeolite may be selected as the water removal zeolite 313. The 4A-type zeolite can adsorb a small amount of $CO_2$, but the adsorbable amount thereof is small.

In view of the foregoing, the $CO_2$ removal zeolite 314 is formed so as to contain the 5A-type zeolite, the 10X-type zeolite, and the 13X-type zeolite each having an average pore diameter larger than that of the 4A-type zeolite.

In this case, the $CO_2$ removal zeolite 314 may be made of one kind selected from the above-mentioned various large pore diameter zeolites, or made of a mixture of a plurality of kinds of large pore diameter zeolites. Further, at least one of the 3A-type zeolite or the 4A-type zeolite and one or plurality of kinds of large pore diameter zeolites may be mixed to form the $CO_2$ removal zeolite 314.

When the natural gas is supplied from the direction indicated by the blank arrow in (a) of FIG. 4 and (b) of FIG. 4, the packed bed may have a configuration in which the respective layers of the ceramic ball 311, the silica gel 312, the water removal zeolite 313, the $CO_2$ removal zeolite 314, and the ceramic ball 311 are formed in the order from an upstream side ((a) of FIG. 4). In this case, a decrease in $CO_2$ adsorption ability of the $CO_2$ removal zeolite 314 in association with the water adsorption can be suppressed by arranging the water removal zeolite 313 on the upstream side of the $CO_2$ removal zeolite 314.

In addition, as described above, the packed bed may have a configuration in which the respective layers of the ceramic ball 311, the silica gel 312, the $CO_2$ removal zeolite 314, the water removal zeolite 313, and the ceramic ball 311 are formed in the order from an upstream side ((b) of FIG. 4).

Further, it is not a requirement to fill the water removal zeolite 313 and the $CO_2$ removal zeolite 314 as separate layers as illustrated in (a) of FIG. 4 and (b) of FIG. 4. For example, the water removal zeolite 313 and the $CO_2$ removal zeolite 314 may be mixed to form a packed bed in each of the adsorption columns 31.

In the case of the existing LNG plant 1, the filling amount of the $CO_2$ removal zeolite 314 in each of the adsorption columns 31 (31a to 31c) is determined based on the past operation achievement in consideration of an increase width of the concentration of $CO_2$ at the time of occurrence of a $CO_2$ spike, the duration and frequency of occurrence of the $CO_2$ spike, the interval of performance between regenerations, and like. In addition, in the case of the newly installed LNG plant 1, the filling amount is determined based on the operation achievement in another LNG plant 1 in consideration of the difference in LNG production amount and $CO_2$ content in the natural gas to be treated in the LNG plant 1 to be designed.

Based on those preliminary investigations, regarding each of the adsorption columns 31, the average number of occurrences of the $CO_2$ spike expected to occur from the start of the treatment of the natural gas to the next regeneration, and the $CO_2$ inflow amount to each of the adsorption columns 31 at the time of occurrence of the $CO_2$ spike are calculated. Then, the $CO_2$ removal zeolite 314 is filled into each of the adsorption columns 31 in an amount that can prevent $CO_2$ having a concentration equal to or more than a controlled value (50 mol ppm in the above-mentioned example) from flowing out to the separation and liquefaction unit 16 even when the $CO_2$ spike occurs.

Meanwhile, when the $CO_2$ spike occurs, the frequency of occurrence and the inflow amount of $CO_2$ from the acid gas removal unit 13 to the water removal unit 14 may be equal to or more than expected levels. As a result, for example, when $CO_2$ flows into the adsorption tower 31 in an amount equal to or more than the adsorption ability of the $CO_2$ removal zeolite 314, there is risk in that the natural gas containing $CO_2$ having a concentration equal to or more than the controlled value may be supplied to the separation and liquefaction unit 16.

In view of the foregoing, as illustrated in FIG. 3, in the water removal unit 14 in this example, the $CO_2$ concentration meter 36 configured to measure the concentration of $CO_2$ in the dried natural gas having flowed out from the adsorption columns 31a to 31c is provided in the outlet line 302, and is configured to manage the concentration of $CO_2$ in the natural gas supplied to the separation and liquefaction unit 16. The $CO_2$ concentration meter 36 corresponds to an outlet-side carbon dioxide measurement unit in this example.

Herein, the measurement value of the concentration of $CO_2$ measured by the $CO_2$ concentration meter 36 on an outlet side of the water removal unit 14 may be output to the control unit 102, which is a control computer, provided in a control room of the LNG plant 1 and be used for operation control of the LNG plant 1. In addition, the above-mentioned measurement value of the concentration of $CO_2$ in the $CO_2$ concentration meter 23 provided on the outlet side of the acid gas removal unit 13 (inlet of the water removal unit 14) may be utilized to grasp the occurrence of the $CO_2$ spike and identify the inflow amount of $CO_2$ to the water removal unit 14 at the time of occurrence of the $CO_2$ spike.

In FIG. 3, the two $CO_2$ concentration meters 23 and 36 are separately provided, but the $CO_2$ concentration meters 23 and 36 may be used in common. For example, respective sampling lines may be branched from the outlet of the acid gas removal unit 13 and the outlet line 302 and connected to a common $CO_2$ concentration meter. Then, for example, the sampling lines connected to the $CO_2$ concentration meter may be periodically switched to monitor the concentration of $CO_2$ in the natural gas at each sampling position.

In addition, when the $CO_2$ spike occurs, the concentration of $CO_2$ usually rises from the upstream side. Accordingly, the concentration of $CO_2$ in the natural gas at the outlet of the acid gas removal unit 13 is monitored at normal time, and when the occurrence of the $CO_2$ spike is recognized, the sampling position at which the concentration of $CO_2$ is measured is switched to the outlet line 302 side, to thereby monitor the concentration of $CO_2$ in the dried natural gas.

The action of a natural gas pretreatment system including the acid gas removal unit 13 and the water removal unit 14 having the above-described configurations is described with reference to FIG. 5 to (a) and (b) of FIG. 7.

Figure 5:
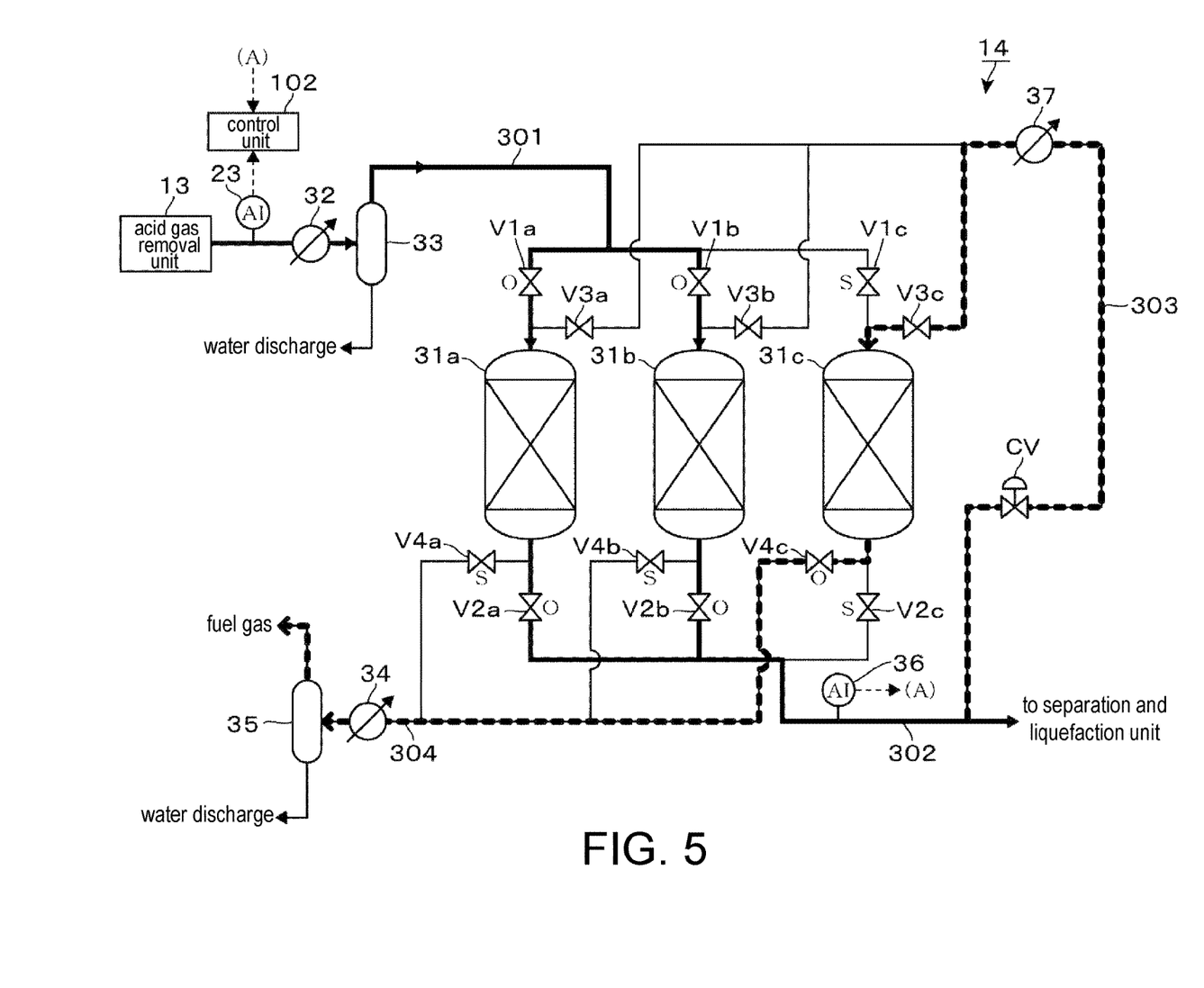
FIG. 5 is an action diagram of the water removal unit.

The operation state of the water removal unit 14 at a certain time point is illustrated in FIG. 5. The thick solid line arrows in FIG. 5 each indicate the flow of the natural gas from which water is removed, and the thick broken line arrows each indicate the flow of regeneration gas for regenerating the water removal zeolite 313, the $CO_2$ removal zeolite 314, and the silica gel 312 in the packed bed. According to the figure, water removal in the natural gas is performed through use of the adsorption columns 31a and 31b, and regeneration using the regeneration gas is performed in the adsorption column 31c.

Figure 6:
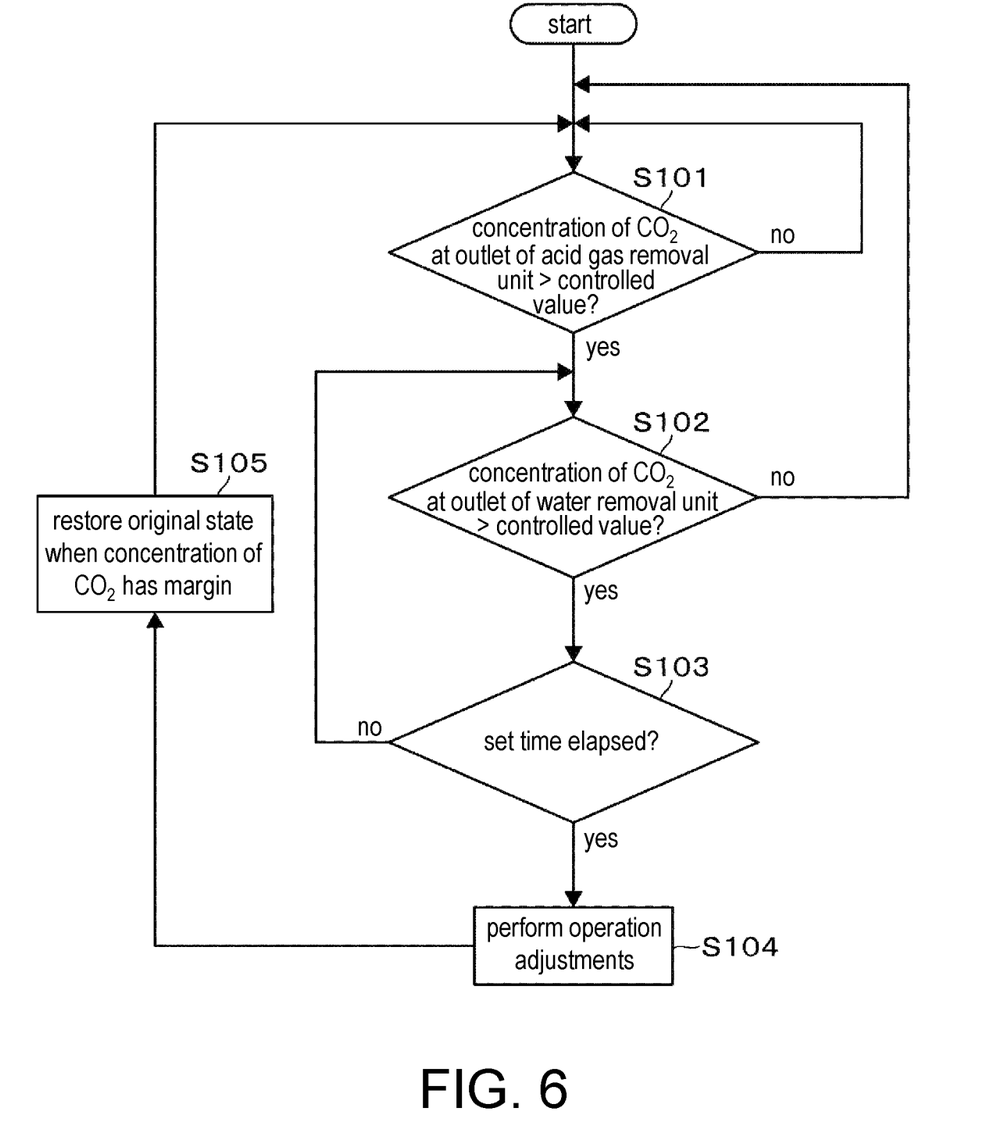
FIG. 6 is an operation flow of the acid gas removal unit and the water removal unit.

The operation of the water removal unit 14 when the $CO_2$ spike occurs in this case is described with reference to FIG. 6.

When the natural gas from which acid gas, such as $CO_2$, has been removed flows out from the acid gas removal unit 13 (start), the concentration of $CO_2$ in the natural gas is measured by the $CO_2$ concentration meter 23 at the outlet position of the acid gas removal unit 13 (Step S101). When the concentration of $CO_2$ is less than the controlled value, the monitoring of the concentration of $CO_2$ is continued as it is (step S101; YES), and the natural gas is supplied to the adsorption columns 31a and 31b, with the result that water removal is performed.

Figure 7:
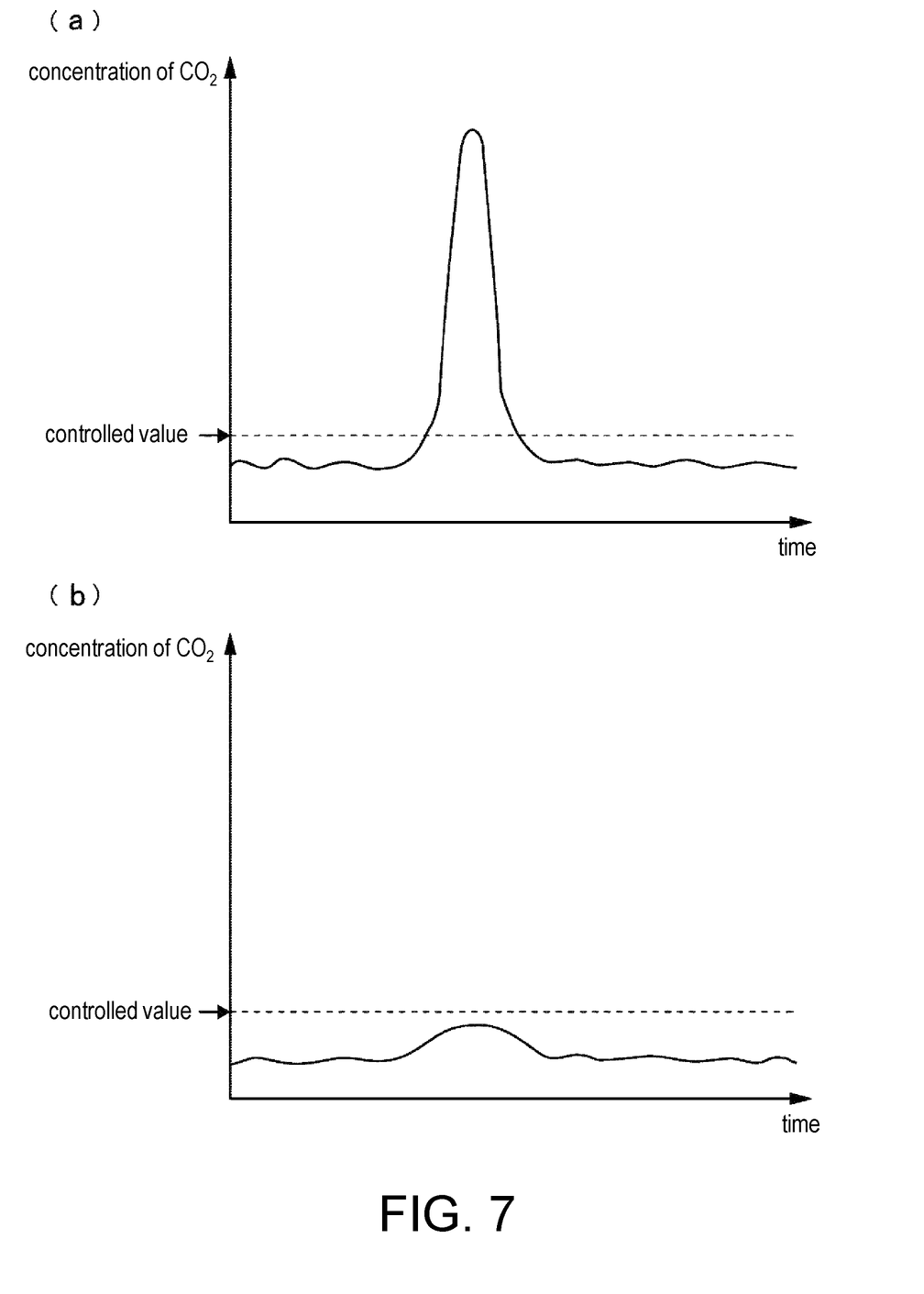

Meanwhile, as shown in (a) of FIG. 7, when the $CO_2$ spike, with which the concentration of $CO_2$ in the natural gas abruptly rises for a short period of time, occurs on the outlet side of the acid gas removal unit 13, it is detected by the $CO_2$ concentration meter 36 on the outlet side that the concentration of $CO_2$ has reached the controlled value or more (step S101; YES).

However, the adsorption columns 31a and 31b are filled with the $CO_2$ removal zeolite 314 as described above, and hence $CO_2$ contained in the natural gas can be removed with the $CO_2$ removal zeolite 314.

Then, the concentration of $CO_2$ in the natural gas flow at the outlet of the water removal unit 14 (adsorption columns 31a and 31b) is measured by the $CO_2$ concentration meter 36 provided in the outlet line 302 (step S102). When $CO_2$ is removed with the $CO_2$ removal zeolite 314 filled in the adsorption columns 31a and 31b in some cases, the concentration of $CO_2$ in the dried natural gas supplied to the separation and liquefaction unit 16 can be maintained below the controlled value, as shown in (b) of FIG. 7. In this case, the monitoring of the concentration of $CO_2$ is continued as it is (step S102; YES), and the dried natural gas from which water has been removed and $CO_2$ having flowed out along with the occurrence of the $CO_2$ spike has been removed is supplied to the separation and liquefaction unit 16.

Meanwhile, when $CO_2$ exceeding the amount that can be removed with the $CO_2$ removal zeolite 314 has flowed in, it is detected by the $CO_2$ concentration meter 36 on the outlet side of the water removal unit 14 that the concentration of $CO_2$ in the natural gas has reached the controlled value or more (step S102; YES). In this case, it is checked whether or not the state in which the concentration of $CO_2$ is equal to or more than the controlled value is continued for a period of time set in advance of from about 1 second to about 1 minute or from about 5 minutes to about 15 minutes (step S103).

When an abnormal value in association with an instantaneous voltage fluctuation or the like is detected, the detected value of the concentration of $CO_2$ is restored within the set period of time (step S103; NO), and hence the monitoring of the concentration of $CO_2$ in the natural gas on the outlet side of the water removal unit 14 is continued (step S102).

When the monitoring is continued for the above-mentioned set period of time, and there is a high possibility that the concentration of $CO_2$ in the natural gas is actually rising (step S103; YES), various operation adjustments are performed (step S104).

As specific contents of the operation adjustments, there can be illustrated a case in which the circulation amount of the absorption liquid supplied from the regeneration column 22 to the absorption column 21 in the acid gas removal unit 13 is increased, or a case in which the treatment amount of the natural gas to be treated in the LNG plant 1 is decreased. The operation adjustments may be automatically performed by the control unit 102, or an operator may adjust the operation by issuing an alarm through the control unit 102 or the like.

Along with the completion of the operation adjustments, the concentration of $CO_2$ in the natural gas on the outlet side of the water removal unit 14 becomes less than the controlled value. After that, when time elapses, and the concentration of $CO_2$ becomes stable under a state of having a margin with respect to the controlled value, an operation adjustment for returning the above-mentioned operation adjustments (increase in circulation amount of the absorption liquid and a decrease in treatment amount of the natural gas) to the original state may be performed (step S105).

The pretreatment system including the acid gas removal unit 13 and the water removal unit 14 is configured to perform the operation described above while sequentially switching the adsorption columns 31a to 31c to be subjected to water removal and regeneration.

The natural gas pretreatment system (acid gas removal unit 13, water removal unit 14) according to this embodiment has the following effects. In addition to the packed bed of the water adsorbent (water removal zeolite 313) forming the water removal unit 14, the packed bed of the carbon dioxide adsorbent ($CO_2$ removal zeolite 314) for adsorbing and removing the $CO_2$ that has not been completely removed in the water removal unit 14 in a previous stage is further formed, and the concentration of the $CO_2$ contained in the natural gas is measured on the outlet side of the water removal unit 14. With this configuration, even when an operation fluctuation occurs on the acid gas removal unit 13 side in the previous stage, and the natural gas containing the $CO_2$ in an amount equal to or more than the controlled value flows out, the outflow of the $CO_2$ to the downstream side (the separation and liquefaction unit 16 in this example) of the water removal unit 14 can be suppressed.

As a result, the opportunity of performing the operation adjustments, such as an increase in circulation amount of the absorption liquid and a decrease in treatment amount of the natural gas, can be limited to an unavoidable case in which the concentration of $CO_2$ in the natural gas has actually risen.

Herein, the plant to which the above-mentioned natural gas pretreatment system (acid gas removal unit 13, water removal unit 14) can be applied is not limited to the LNG plant 1. This technology can also be applied to a separation and recovery plant configured to separate and recover a natural gas liquid that are a LPG and a heavy component from a natural gas.

In this case, there can be illustrated a case in which a separation and recovery unit configured to ship a light natural gas in a gas state through a pipeline while separating and recovering a LPG and a heavy component by cooling a natural gas is provided instead of the separation and liquefaction unit 16 illustrated in FIG. 1.

The invention claimed is:

1. A natural gas pretreatment system for a liquefaction plant or a separation and recovery plant of a natural gas, the natural gas pretreatment system comprising:
   a carbon dioxide removal unit configured to remove carbon dioxide contained in the natural gas by bringing an absorption liquid and the natural gas into contact with each other; and
   a water removal unit configured to remove water contained in the natural gas by causing the natural gas after being brought into contact with the absorption liquid in the carbon dioxide removal unit to flow through a packed bed containing a water adsorbent,
   wherein the packed bed contains a carbon dioxide adsorbent for adsorbing and removing the carbon dioxide that has not been completely removed in the carbon dioxide removal unit, and
   wherein the natural gas pretreatment system further comprises an inlet-side carbon dioxide measurement unit configured to measure a concentration of the carbon dioxide contained in the natural gas on an inlet side of the water removal unit, and an outlet-side carbon dioxide measurement unit configured to measure a concentration of the carbon dioxide contained in the natural gas on an outlet side of the water removal unit,
   the natural gas pretreatment system further comprises a control unit configured to increase a circulation amount of the absorption liquid in the carbon dioxide removal unit or to decrease a treatment amount of the natural gas, when the concentration of the carbon dioxide contained in the natural gas measured in the inlet-side carbon dioxide measurement unit is more than a preset controlled value corresponding to the inlet-side carbon dioxide measurement unit and the concentration of the carbon dioxide contained in the natural gas measured in the outlet-side carbon dioxide measurement unit is more than a preset controlled value corresponding to the outlet-side carbon dioxide measurement unit, and a state in which the concentration of the carbon dioxide is more than the preset controlled value corresponding to the outlet-side carbon dioxide measurement unit is continued for a preset time or more.

2. The natural gas pretreatment system according to claim 1,
   wherein the water adsorbent and the carbon dioxide adsorbent are each a molecular sieve, and
   wherein the carbon dioxide adsorbent has an average pore diameter of the molecular sieve larger than an average pore diameter of the molecular sieve of the water adsorbent.

3. The natural gas pretreatment system according to claim 2,
   wherein the molecular sieve forming the water adsorbent is 3A-type zeolite, and the molecular sieve forming the carbon dioxide adsorbent contains at least one zeolite selected from 4A-type zeolite, 5A-type zeolite, 10X-type zeolite, and 13X-type zeolite.

4. The natural gas pretreatment system according to claim 2,
   wherein the packed bed has the water adsorbent and the carbon dioxide adsorbent packed therein so as to be separated into different layers, and
   wherein, when viewed along a flow direction of the natural gas, the layer of the carbon dioxide adsorbent is arranged on a downstream side with respect to the layer of the water adsorbent.

5. The natural gas pretreatment system according to claim 2,
   wherein the molecular sieve forming the water adsorbent is 4A-type zeolite, and the molecular sieve forming the carbon dioxide adsorbent contains at least one zeolite selected from 5A-type zeolite, 10X-type zeolite, and 13X-type zeolite.

* * * * *